UNITED STATES PATENT OFFICE.

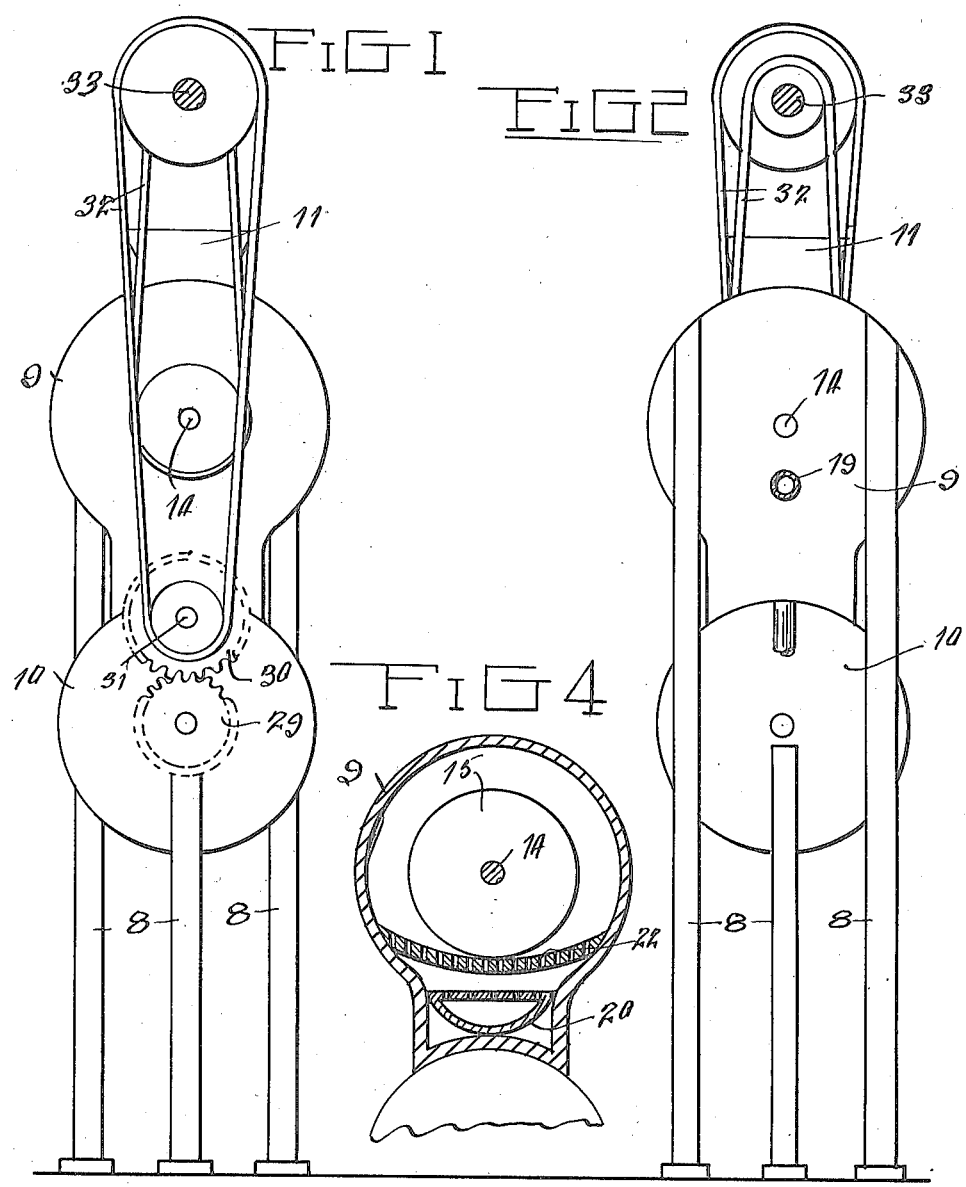

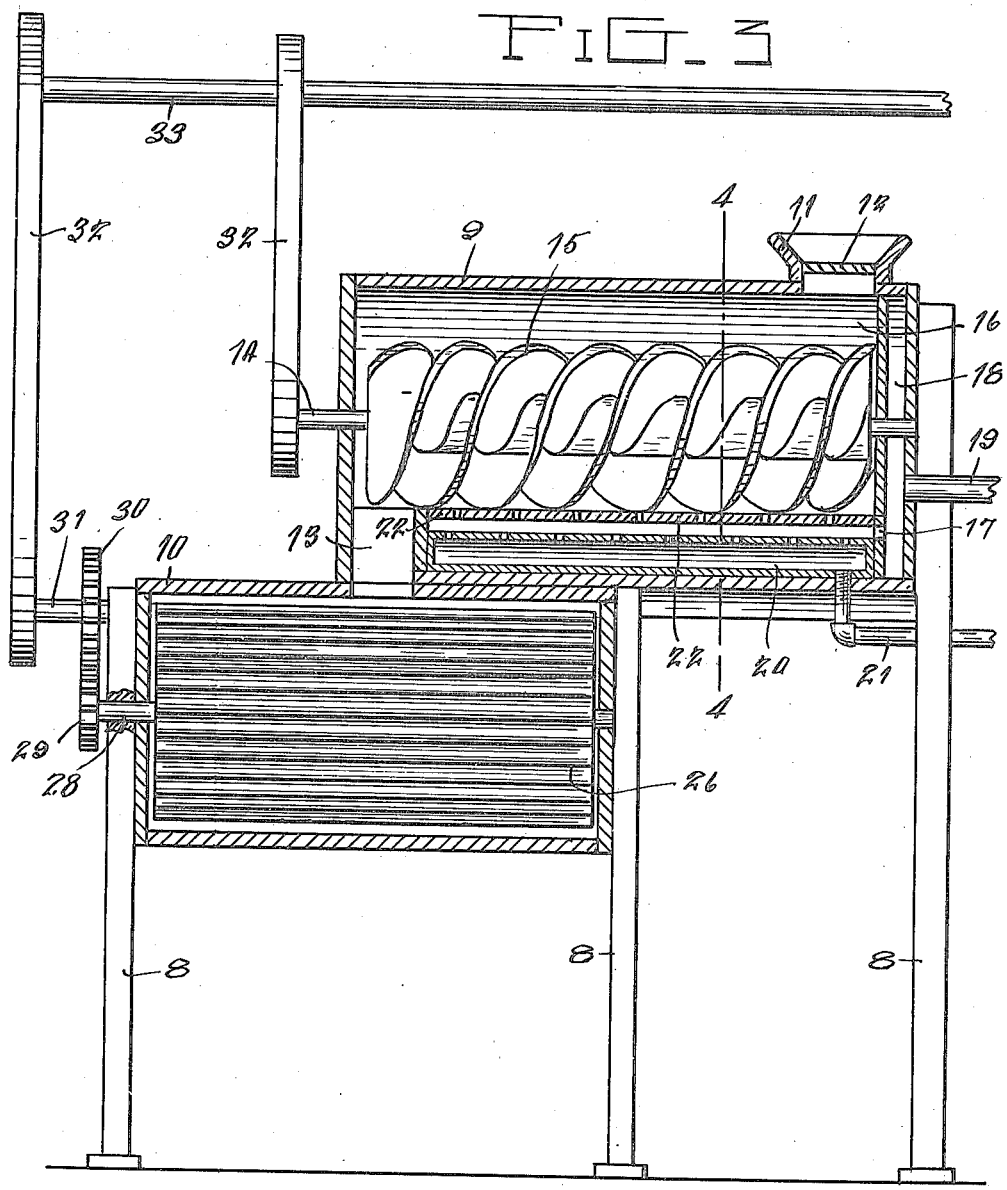

ROBERT HERNDON, OF HOUSTON, TEXAS.

COFFEE ROASTING AND GRINDING MACHINE.

1,180,150. Specification of Letters Patent. Patented Apr. 18, 1916.

Application filed August 5, 1914. Serial No. 855,208.

*To all whom it may concern:*

Be it known that I, ROBERT HERNDON, a citizen of the United States, residing at Houston, in the county of Harris and State of Texas, have invented certain new and useful Improvements in Coffee Roasting and Grinding Machines; and I do hereby declare the following to be a full, clear, and exact description of the invention, such as will enable others skilled in the art to which it appertains to make and use the same.

This invention relates to a combined roasting and grinding machine especially designed for treating coffee and has for its object to provide a device of this character of improved and simplified construction.

Another object is the provision of a machine of this character embodying a casing or oven containing a suitable burner and a rotatable worm for conveying the coffee from end to end of the casing and insuring a uniform action of the heat thereon.

With these and other objects in view, the invention consists of the novel combination and arrangement of parts which will be fully set forth in the following specification and accompanying drawings, in which:

Figure 1 represents an end elevation of the combined roasting and grinding machine. Fig. 2 represents an elevational view of the opposite end of the machine. Fig. 3 represents a longitudinal sectional view through the machine. Fig. 4 represents a transverse sectional view on the line 4—4 of Fig. 3.

Referring to the drawing in detail, wherein similar reference numerals designate corresponding parts throughout the several views, the numeral 8 indicates a plurality of vertically arranged supporting legs or standards, preferably arranged in pairs for supporting the upper and lower cylindrical casings 9 and 10 respectively. The upper cylinder 9 is provided at one end and adjacent the top thereof with a flared mouth 11 adapted to be closed by a sliding valve 12. The casing 9 communicates with the central portion of the lower casing 10 through a suitable pipe 13 carried by the lower portion of the upper cylinder 9 at the end opposite that at which the flared mouth 11 is located. A shaft 14 is rotatably mounted in the end walls of the upper cylinder 9 and carries a conveyer 15 arranged within said cylinder and in spaced relation to the circumferential wall thereof. A partition 16 is secured in the end of the casing 9 adjacent the flared mouth 11 and is provided in its lower portion with an aperture 17. The chamber 18 between the partition 16 and adjacent end wall of the casing 9 is connected with a pipe 19 for carrying off the products of combustion from a burner 20 located in the lower portion of the cylinder 9 and adapted to be fed with a gaseous fuel through a feed pipe 21. A perforated plate 22 is arranged between the perforated parts of the burner 20 and the conveyer 15 and is curved, as clearly illustrated in Fig. 4, so that the material dropped upon the plate will be directed downwardly into position to be operated upon by the screw conveyer 15.

A preferred type of grinding or crushing cylinder 26 is rotatably supported within the cylinder 10 upon a shaft 28 carrying at one end exteriorly of the casing 10, a gear wheel 29 meshing with a gear wheel 30 carried by the intermediate shaft 31.

The shafts 14 and 31 are provided on their outer extremities with pulleys over which are positioned belts or other suitable devices for transmitting power from a power shaft 33 to the shafts 14 and 31 and the parts of the machine operated thereby. The coffee to be roasted and ground is introduced through the top cylinder 9 through the flared mouth 11, the conveyer 15 agitating and conveying the coffee from right to left in the casing 9 over the plate 22 and burner 20. At the left hand end of the casing 9 the coffee drops into the lower cylinder 10 where it is ground by the cylinder 26.

What I claim is:

1. In combination, a support, a casing mounted in said support, a heater arranged in the lower portion of said casing, a conveyer arranged centrally within said casing, and a curved perforate plate arranged between said heater and said conveyer and having its concaved face disposed adjacent said conveyer.

2. In combination, a support, a casing mounted in said support, a mouth in the upper portion of said casing, a heater arranged in the lower portion of said casing, a partition arranged adjacent one end of said casing providing a chamber and having an aperture through the lower portion thereof communicating with said chamber, a pipe communicating with said chamber and extending exteriorly of said casing, a conveyer arranged centrally within said casing, and a curved apertured plate arranged between said conveyer and said heater and above the opening in said partition.

In testimony whereof I affix my signature in presence of two witnesses.

ROBERT HERNDON.

Witnesses:
R. R. ANDREWS,
B. J. SORINGTON.